Patented Dec. 2, 1952

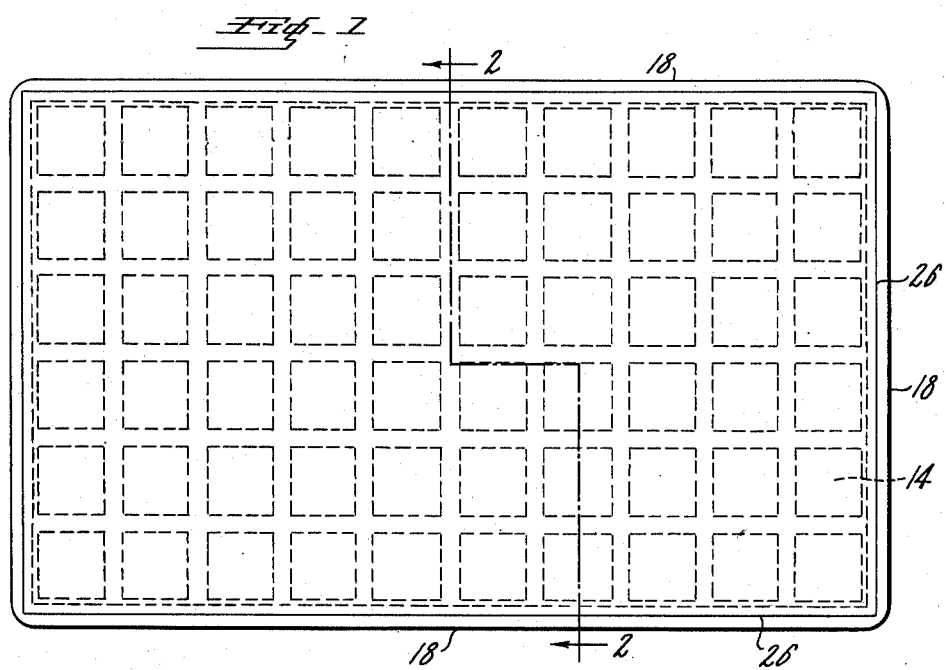
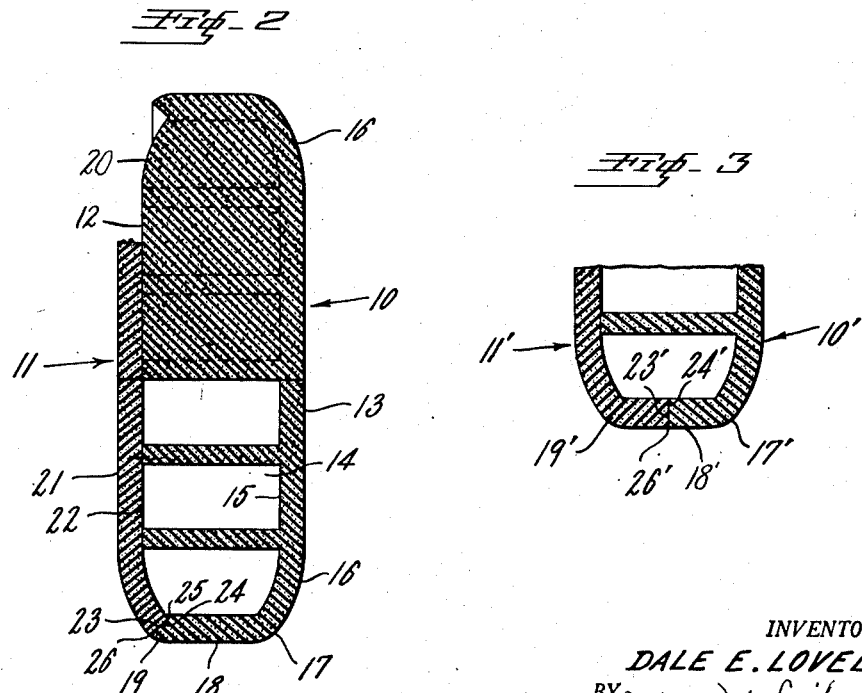
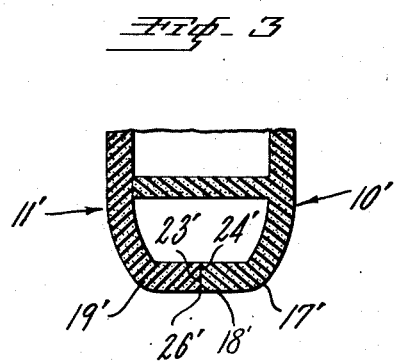

2,620,022

UNITED STATES PATENT OFFICE 2,620,022

CUSHION

Dale E. Lovell, Mishawaka, Ind., assignor to United States Rubber Company, New York, N. Y., a corporation of New Jersey Application November 29, 1949, Serial No. 129,964

5 Claims. (Cl. 155—179)

1

This invention relates to cushions of sponge rubber or like material and has reference more particularly to a reversible cushion structure.

Non-reversible or so-called open-type foam sponge cushions for seat and back cushions for automobiles and upholstery are made of a unitary molded construction of the desired shape with substantially parallel spaced openings or cored out cavities from the base of the cushion toward the opposite face but terminating short of such opposite face to provide a smooth seating or back-resting surface of the cushion. The cavities are formed by cores extending into the mold proper into which the latex foam is poured, as shown in U. S. Patent Nos. 2,310,830 and 2,347,117. The latex foam is gelled and vulcanized and the vulcanized sponge cushions which have a smooth skin formation on the outer surfaces from contact with the smooth inner mold surface are manually stripped from the molds. Stripping is a time consuming operation and must be done with great care to avoid tearing the foam rubber sponge. Reversible cushions are made by cementing together two molded half-sections of foam sponge cushions, which are similar to open-type cushions, the surfaces from which the cored openings extend being cemented together. Before cementing, the half sections are tested for compression resistance and those having the same resistance are matched. It is not generally necessary or desirable to cement the entire contacting surfaces, but the edge portions are usually fairly well cemented, leaving air-vent holes, if desired. The entire outer surface of such a cushion has a smooth skin formation since the halves were molded against the smooth inside surface of the mold, the only break in the continuity of such smooth outer surface of the cushion being the fine lined but joint, which is not objectionable, running around the side of the cushion intermediate the top and bottom faces where the inner surfaces of the half sections were cemented at their edge portions. Reversible cushions of various types, seat and back cushions and bed pillows, have been made in this manner, as shown in U. S. Patent 2,315,391. Because two molded half-sections are required to produce each cushion, the damage due to stripping is high. Other disadvantages are that each half-section must be trimmed of flash and carefully matched with another having the same compression resistance. Also, the manufacture of such reversible cushions has an additional disadvantage in the larger number of molds and increased vulcanizer space that are needed.

2

The object of the present invention is to provide a reversible cushion of a spongy rubber-like material such as from foamed rubber latex which is constructed of only one molded pre-shaped section and yet has a smooth skin texture over its entire exposed surface.

The foregoing and other objects are accomplished as pointed out hereinafter and as shown in the accompanying drawing in which:

Figure 1 is a top view of a cushion constructed in accordance with my invention;

Fig. 2 is a sectional view on the line 2—2 of Fig. 1 with part broken away; and

Fig. 3 is a sectional view with part broken away showing a modification of Fig. 2.

The cushion of the present invention is preferably made of foamed rubber latex. Foamed rubber latex may be prepared by whipping the compounded latex containing a foaming agent into a froth or foam, or by stirring the compounded latex into a separately prepared froth or foam. The latex may also be foamed by chemically evolving a gas in the latex as by the decomposition of hydrogen peroxide on a carbonate in the latex in known manner. The latex from which the foam is prepared or the thus prepared latex foam may have a delayed coagulant or gelling agent added to it before the foam is poured into molds. The molded foam may be gelled and vulcanized and the sponge rubber product stripped from the molds. As known, the foam without added gelling agent may be poured into molds, or the latex may be chemically blown in the molds, and the foam frozen in the molds, with concurrent or subsequent coagulation. The technique of preparing latex foams, and molding and gelling and vulcanizing the same is conventional today as illustrated in various patents, such as U. S. Patents 1,852,447, 2,126,275, 2,290,729, 2,309,005, 2,347,117 and 2,432,353. In the reversible cushion of the present invention, only one pre-shaped molded section is necessary and this may be made similarly to the open-type foam cushions or half-sections of the prior reversible cushions in molds of the desired shape in the manner illustrated in U. S. Patents 2,310,830 and 2,347,117, above referred to. The other section of the reversible cushion of the present invention is made from foam sponge sheet stock, which, as known, may be made by spreading or pouring the latex foam containing a gelling agent on a continuous conveyor with side guide ledges along the conveyor at the desired width of the sheet, and if desired, with dividing ledges across the width of the conveyor to give sheets of any desired length. Alternatively, the conveyor may be equipped with flat pans of the desired dimension of the sheets. The foam is gelled and vulcanized to form the flat sheet stock as shown in U. S. Patent 2,441,235. Such sheet stock is readily stripped from the conveyor mold without tearing, since, unlike the open-type cushions, or the half-sections of previous reversible cushions, or the pre-shaped other part of the reversible cushion of the present invention, there are no cores to be removed from the sponge with subsequent removal of a complicated shaped section from the mold. The surface of the sheet sponge which was stripped from the conveyor or pan-shaped mold will have a smooth skin formation, as generally will the opposite open molded surface of the sheet.

As illustrated in the drawing, more particularly Figs. 1 and 2, the reversible cushion of the present invention is constructed from a sponge pre-shaped section 10 and a sponge sheet stock section 11. In the illustrated embodiment, which is a bed pillow, the cushion is of a generally rectangular shape. The pre-shaped section 10 has a base 13 and an opposite face 12. The exposed surface of the pre-shaped section 10 will have a smooth skin formation. There are a series of walls extending from the base 13 to the opposite face 12 which define a series of substantially parallel spaced openings 14 having their entrances in the face 12 and extending outwardly towards and terminating at the base 13 as shown at 15. The base 13 tapers near the edge of the cushion towards the center plane of the cushion at 16, makes a rounded cushion edge at 17, and then provides a perimetric wall structure 18 which surrounds the cavities 14 and forms the sides or boxing of the cushion. In the cushion in Figure 2, the perimetric wall 18 makes another rounded cushion edge at 19. The face 12 of the pre-shaped section 10 tapers near the edge of the cushion towards the plane of the cushion at 20. The flat sheet-stock section 11 has an exposed face 21, and an inner face 22, which latter is superposed on the face 12 of the pre-shaped section 10. Because of the tapers 16 and 20, the sides of the cushion 18 provide a boxing surface around the cushion of less depth than thickness at the center or crown of the cushion, which is desirable in reversible cushions. The terminal edge 23 of the sheet-stock section 11 which may be a cut edge, is butt jointed to the terminal edge 24 of the perimetric wall 18 of the pre-shaped section 10. The terminal edge 24 may be provided with a groove 25 to better position the terminal edge 23 of the sheet-stock section. The terminal edge 23 is butt cemented in whole or in part to the terminal edge 24. The inner face 22 of the sheet-stock section may also be cemented in whole or in part to the face 12 of the pre-shaped section. The exposed surface 21 of the flat sheet-stock section 11, similarly to the exposed surface of the pre-shaped section 10, will have a smooth skin formation. Thus the cushion of the present invention will have a smooth skin formation over its entire exposed surface. The cushion has only one butt joint, and the cushion surface shows only one seam line 26 on the tapered portion of the face 21 of the cushion near the rounded cushion edge 19. If desired, the seam line may be placed intermediate the rounded cushion edges 17 and 19 as shown in the modification in Fig. 3. In Fig. 3, the terminal edge 26' of the perimetric wall 18' of the pre-shaped section 10' is intermediate the rounded cushion edges 17' and 19' and is cemented to the terminal edge 23' of the sheet-stock section 11'. The visible seam line 26' is thus on the boxing intermediate the rounded cushion edges 17' and 19'. The corners of the sheet-stock section 11' may be cut before cementing to fit smoothly over the molded rounded cushion edges at 19', having a seam line over the cushion edge which intersects the seam line 26' at right angles thereto. The pre-molded section may have air vent holes in the sides thereof, or uncemented portions of the butt joint may act as air vent holes or slits. There are no exposed raw surfaces of sponge, as from cutting or trimming or buffing which would be the expected result of using flat stock in making cushions. Usually in building up cushions in part from flat stock, wherever the flat stock is carried to the edge, it must be cut or trimmed. If the cushion edge is to be rounded, the flat stock must be buffed. Such exposed raw trimmed or buffed edges are easily torn and do not have the desired smooth velvety feel of the skin construction on the faces of the sheet-stock or other molded surfaces. In the cushion construction of the present invention, all the rounded cushion edges have a skin formation, either both from the pre-shaped molded section, as in the embodiment in Figs. 1 and 2 of the drawing, or one rounded edge from the pre-shaped molded section and one from the surface of the sheet-stock, as in the modification in Fig. 3 of the drawing where the terminal edge of the sheet-stock is butt jointed to the pre-shaped section in the boxing intermediate the rounded cushion edges. The entire cushion as illustrated in the drawing, may be covered with sponge sheet-stock cemented to the outer surface of the cushion to give a heavier type of cushion for certain types of upholstery uses.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A reversible cushion of the class described, comprising a section of pre-shaped spongy rubber-like material and a section of sheet spongy rubber-like material, said pre-shaped section including a base and a series of walls extending from said base and defining a series of substantially parallel spaced cavities, said base providing a perimetric wall structure surrounding said series of cavities, and said sheet section being superposed on said series of walls with its terminal edge making a butt joint with and at least partly secured to the terminal edge of said perimetric wall, said cushion having a skin construction over its entire exposed surface.

2. A reversible cushion of the class described, comprising a section of pre-shaped spongy rubber-like material and a section of sheet spongy rubber-like material, said pre-shaped section including a base and a series of walls extending from said base and defining a series of substantially parallel spaced cavities, said base providing a perimetric wall structure surrounding said series of cavities, and said sheet section being superposed on said series of walls with its terminal edge making a butt joint with and at least partly secured to the terminal edge of said perimetric wall, said cushion having rounded cushion edges, and said cushion having a skin construction over its entire exposed surface.

3. A reversible cushion of the class described, comprising a section of pre-shaped spongy rubber-like material and a section of sheet spongy rubber-like material, said pre-shaped section including a base and a series of walls extending from said base and defining a series of substantially parallel spaced cavities, said base providing a perimetric wall structure surrounding said series of cavities, and said sheet section being superposed on said series of walls with its terminal edge making a butt joint with and at least partly secured to the terminal edge of said perimetric wall, said cushion having rounded cushion edges and side boxing of less depth than the thickness of the cushion at the center, and said cushion having a skin construction over its entire exposed surface.

4. A reversible cushion of the class described, comprising a section of pre-shaped spongy rubber-like material and a section of sheet spongy rubber-like material, said pre-shaped section including a base and a series of walls extending from said base and defining a series of substantially parallel spaced cavities, said base providing a perimetric wall structure surrounding said series of cavities, and said sheet section being superposed on said series of walls with its terminal edge making a butt joint with and at least partly secured to the terminal edge of said perimetric wall, said cushion having two rounded cushion edges the exposed surfaces of which are part of the exposed surface of said pre-shaped section, and said cushion having a skin construction over its entire exposed surface.

5. A reversible cushion of the class described, comprising a section of pre-shaped spongy rubber-like material and a section of sheet spongy rubber-like material, said pre-shaped section including a base and a series of walls extending from said base and defining a series of substantially parallel spaced cavities, said base providing a perimetric wall structure surrounding said series of cavities, and said sheet section being superposed on said series of walls with its terminal edge making a butt joint with and at least partly secured to the terminal edge of said perimetric wall, said cushion having two rounded cushion edges one exposed surface of which is a part of the exposed surface of said pre-shaped section and the other surface of which is a part of the exposed surface of said sheet section, and said cushion having a skin construction over its entire exposed surface.

DALE E. LOVELL.

REFERENCES CITED

The following references are of record in the file of this patent:

UNITED STATES PATENTS

| Number | Name | Date |
|---|---|---|
| 2,189,813 | McGuire | Feb. 13, 1940 |
| 2,315,391 | Blair | Mar. 30, 1943 |

FOREIGN PATENTS

| Number | Country | Date |
|---|---|---|
| 392,550 | Great Britain | May 15, 1933 |